(12) United States Patent
Jin et al.

(10) Patent No.: US 11,858,827 B2
(45) Date of Patent: Jan. 2, 2024

(54) PREPARATION METHOD OF A NANOTUBE HIERARCHICALLY STRUCTURED LITHIUM TITANATE AND USE AND PRODUCT THEREOF

(71) Applicant: PETROCHINA COMPANY LIMITED, Beijing (CN)

(72) Inventors: Xu Jin, Beijing (CN); Jianming Li, Beijing (CN); He Liu, Beijing (CN); Hang Jiao, Beijing (CN); Xiaoqi Wang, Beijing (CN); Liang Sun, Beijing (CN); Xiaodan Liu, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 1154 days.

(21) Appl. No.: 16/556,224

(22) Filed: Aug. 29, 2019

(65) Prior Publication Data
US 2020/0071184 A1 Mar. 5, 2020

(30) Foreign Application Priority Data

Aug. 30, 2018 (CN) .......................... 201811002667.X (51) Int. Cl.
*C01G 23/00* (2006.01)
*C01D 15/00* (2006.01)
(Continued)

(52) U.S. Cl.
CPC .......... *C01G 23/005* (2013.01); *C01D 15/00* (2013.01); *C01G 23/001* (2013.01); *B82Y 30/00* (2013.01); *B82Y 40/00* (2013.01)

(58) Field of Classification Search
CPC .... C01G 23/005; C01G 23/001; C01D 15/00; B82Y 30/00; B82Y 40/00
(Continued)

(56) References Cited

U.S. PATENT DOCUMENTS

2013/0102458 A1 4/2013 Wong et al.

FOREIGN PATENT DOCUMENTS

| CN | 102531050 A | 7/2012 |
|---|---|---|
| CN | 103570063 A | 2/2014 |

(Continued)

OTHER PUBLICATIONS

CN-108975390 A, Dec. 11, 2018, abstract. (Year: 2018).*
(Continued)

*Primary Examiner* — Steven J Bos
(74) *Attorney, Agent, or Firm* — FOLEY & LARDNER LLP (57) ABSTRACT

A preparation method of a nanotube hierarchically structured lithium titanate includes the steps of: S1. dispersing a titanium source into an aqueous solution containing lithium hydroxide and hydrogen peroxide and stirring to obtain a mixed solution; S2. subjecting the mixed solution obtained in step S1 to a reaction by heating to obtain a precursor having a nanowire-like structure; S3. subjecting the precursor having a nanowire-like structure obtained in step S2 to separation and drying; S4. subjecting the precursor having a nanowire-like structure after separation and drying to a low-temperature annealing treatment; S5. subjecting the precursor having a nanowire-like structure after the low-temperature annealing treatment to a liquid thermal reaction to obtain the nanotube hierarchically structured lithium titanate. The method includes a simple process and easily controllable process parameters, and may be easily scaled-up for industrial production.

15 Claims, 3 Drawing Sheets

(51) Int. Cl.
    *B82Y 30/00*    (2011.01)
    *B82Y 40/00*    (2011.01)

(58) Field of Classification Search
    USPC .......................................................... 423/598
    See application file for complete search history.

(56) References Cited

FOREIGN PATENT DOCUMENTS

| CN | 104064735 A | 9/2014 |
|---|---|---|
| CN | 104201364 A | 12/2014 |
| CN | 104261465 A | 1/2015 |
| CN | 107256961 A | 10/2017 |
| CN | 108946798 A | 12/2018 |
| KR | 101454865 B1 | 11/2014 |

OTHER PUBLICATIONS

CN-104201364 A, Dec. 10, 2014, abstract and disclosure. (Year: 2014).*
English language translation of Chinese Office Action and Search Report, App. No. 201811002667.X, Petrochina Company Limited, (dated May 9, 2020).
Extended European Search Report, App. No. 19194479.2, Petrochina Company Limited (dated Nov. 29, 2019).
Yu et al., "Fabrication and photovoltaic performance of hierarchically titanate tubular structures self-assembled by nanotubes and nanosheets", Chem. Comm., vol. 47, pp. 9161-9163, XP055642506 (2011).
Yu et al., "Fabrication and Photovoltaic Performance of Hierarchically Titanate Tubular Structures Self-assembled by Nanotubes and Nanosheets", Electronic Supplementary Information (ESI) for Chemical Communications, The Royal Society of Chemistry, 7 pages, XP055642667 (2011).
First Office Action and English Translation issued for corresponding Japanese Patent Application 2019-158055 dated Aug.4, 2020. 12 Pages.
Yu, J.et al., Chemical Communications, GB, 2011, vol. 47, pp. 9161-9163.
Chinese Search Report, 8 pages (dated Jul. 13, 2018).
Hanshen, Zhou, "Design and Research of Single Component Liquid Rocket Engine," China Aerospace Publishing House, Aug. 2009, pp. 288-289, 292 (6 pages).

* cited by examiner

PREPARATION METHOD OF A NANOTUBE HIERARCHICALLY STRUCTURED LITHIUM TITANATE AND USE AND PRODUCT THEREOF

CROSS-REFERENCE TO RELATED APPLICATIONS

This application claims the benefit of and priority to Chinese Patent Application No. 201811002667.X, filed Aug. 30, 2018, which is incorporated by reference herein in its entirety.

TECHNICAL FIELD

The present invention relates to the field of preparation of energy and environmentally friendly materials, and in particular, to the preparation method of a nanotube hierarchically structured lithium titanate and the use and product thereof.

BACKGROUND

Lithium titanate, titanic acid, and titanium oxide has been widely used in the technical fields of lithium ion batteries, potassium ion batteries, sodium ion batteries, catalysis, photocatalysis, solar cells, water photolysis, sensing, biology and the like, and is a hotspot for the research in the material field.

Various application properties of lithium titanate, titanic acid and titanium oxide materials are closely related to their morphology and structures. As compared with single crystal nanoparticles, one-dimensional linear nanomaterials can reduce the grain boundary between particles and facilitate the transport of carriers in the long axis direction. They have the following characteristics: (1) at such a nanometer scale, the specific surface area and active sites of the material increase dramatically, which can greatly accelerate the reaction on the surface thereof and the interaction with media; (2) in the photocatalysis field, free migration of photogenerated electron-hole pairs in the long axis direction is facilitated, the recombination probability of electrons and holes is reduced, and the photocatalytic efficiency is improved; (3) in the field of battery electrode materials, the long axis facilitates effective electron migration, the short axis facilitates the rapid intercalation and deintercalation process of lithium, sodium or potassium ions, while the one-dimensional nanostructure has better charging-discharging performance as compared to nanoparticles; (4) in the field of solar cells, the one-dimensional structure can greatly reduce the grain boundary between particles, facilitate the transport of electrons in the photoanode, and greatly improve the efficiency of the accumulation and conversion of electrons and the like in the battery.

The one-dimensional structures mainly include nanowires, nanorods, nanotubes, and nanoribbons. Among them, nanotubes have both inner and outer surfaces, providing a high specific surface area, and is rather advantageous in the research and application of one-dimensional material structures and has thus received much attention.

Since a hierarchical structure has a high degree of order, and can achieve a variety of functions, the design and development thereof have attracted attention. The hierarchical structure can increase the specific surface area of the material, increase the orderliness of the contact among nanoparticles, and enhance the effective migration of electrons. However, the hierarchical structures of lithium titanate, titanic acid, and titanium oxide that have been reported thus far are all in granular forms, and it is impossible to realize a hierarchically structured material having a one-dimensional structure, and to further improve the effective isolation and transport of electrons with a hierarchically structured material.

Therefore, by preparing a one-dimensional nano-material with a hierarchical structure, especially a one-dimensional nanotube-like hierarchical structure, the specific surface area of the material may be significantly increased, the grain boundary between particles may be greatly reduced, thereby solving the problem of the high tendency of electrons-hole recombination and enhancing the effective transport of electrons in the long-axis direction.

SUMMARY

It is an object of the present invention to provide a preparation method of a nanotube hierarchically structured lithium titanate.

It is another object of the present invention to provide a nanotube hierarchically structured lithium titanate prepared by the preparation method.

It is still another object of the present invention to provide an ion battery electrode prepared with the nanotube hierarchically structured lithium titanate.

It is still another object of the present invention to provide a preparation method of a nanotube hierarchically structured titanic acid.

It is still another object of the present invention to provide a nanotube hierarchically structured titanic acid prepared by the preparation method.

It is still another object of the present invention to provide the use of the nanotube hierarchically structured titanic acid.

It is still another object of the present invention to provide a preparation method of a nanotube hierarchically structured titanium oxide.

It is still another object of the present invention to provide a nanotube hierarchically structured titanium oxide prepared by the preparation method.

In order to achieve the above objects, in one aspect, the present invention provides a preparation method of a nanotube hierarchically structured lithium titanate, wherein the method comprises the steps of:
  S1. dispersing a titanium source into an aqueous solution containing lithium hydroxide and hydrogen peroxide and stirring to obtain a mixed solution;
  S2. subjecting the mixed solution obtained in step S1 to a reaction by heating to obtain a precursor having a nanowire-like structure;
  S3. subjecting the precursor having a nanowire-like structure obtained in step S2 to separation and drying;
  S4. subjecting the precursor having a nanowire-like structure after separation and drying to a low-temperature annealing treatment;
  S5. subjecting the precursor having a nanowire-like structure after the low-temperature annealing treatment to a liquid thermal reaction to obtain the nanotube hierarchically structured lithium titanate.

According to some specific embodiments of the present invention, the titanium source is selected from one or more of titanium ethoxide, titanium isopropoxide, titanium propoxide, tetrabutyl titanate, titanium glycolate, titanium glyceroxide, titanium sulfate, titanium oxysulfate, titanium tetrachloride, titanium tetrafluoride, ammonium fluorotitanate, titanium nitride, titanium oxide, metatitanic acid, and orthotitanic acid.

According to some specific embodiments of the present invention, the titanium source is selected from titanic acid hydrate.

According to some specific embodiments of the present invention, the titanic acid hydrate is obtained from a hydrolysis reaction of a titanium-containing compound.

According to some specific embodiments of the present invention, the titanium-containing compound is selected from one or more of titanium ethoxide, titanium isopropoxide, titanium propoxide, tetrabutyl titanate, titanium glycolate, titanium glyceroxide, titanium sulfate, titanium oxysulfate, titanium tetrachloride, titanium tetrafluoride, and ammonium fluorotitanate.

According to some specific embodiments of the present invention, in the hydrolysis reaction, the titanium-containing compound is dispersed in pure water to be directly hydrolyzed to form the titanic acid hydrate; or, in the hydrolysis reaction, the titanium-containing compound is dispersed in an aqueous solution containing an alkaline substance for hydrolysis to form the titanic acid hydrate.

According to some specific embodiments of the present invention, the hydrolysis reaction is a hydrolysis reaction carried out at ambient temperature.

According to some specific embodiments of the present invention, the alkali substance is selected from one or more of aqueous ammonia, sodium hydroxide, potassium hydroxide, tetramethylammonium hydroxide, tetraethylammonium hydroxide, tetrapropylammonium hydroxide, tetrabutylammonium hydroxide, ethylenediamine, diethylamine, triethylamine, ethylamine, ethanolamine, and diethanolamine.

According to some specific embodiments of the present invention, the concentration of the alkali substance in the aqueous solution containing the alkalie substance is 0.001 to 1M.

According to some specific embodiments of the present invention, the titanic acid hydrate is obtained by subjecting the titanium-containing compound to a hydrolysis reaction and a purification treatment; and the purification treatment comprises purifying the product obtained after the hydrolysis reaction of the titanium-containing compound to obtain a titanic acid hydrate having a purity of 97% or more.

According to some specific embodiments of the present invention, the purification treatment is carried out by means of one or more selected from water washing—separation by centrifugation, water washing—membrane separation, water washing—filtration, and dialysis.

According to some specific embodiments of the present invention, in step S1, the concentration of lithium hydroxide in the aqueous solution containing lithium hydroxide and hydrogen peroxide is 0.4 mol/L to 1.0 mol/L, and the volume fraction of hydrogen peroxide in the aqueous solution containing lithium hydroxide and hydrogen peroxide is 0.5% to 10%.

According to some specific embodiments of the present invention, the volume fraction of hydrogen peroxide in the aqueous solution containing lithium hydroxide and hydrogen peroxide is 1.5% to 7%.

According to some specific embodiments of the present invention, the volume fraction of hydrogen peroxide in the aqueous solution containing lithium hydroxide and hydrogen peroxide is 2% to 5%.

According to some specific embodiments of the present invention, in step S2, the reaction by heating is carried out by heating the mixed solution to a temperature of 60° C. to 100° C.

According to some specific embodiments of the present invention, the reaction by heating in step S2 is carried out by heating the mixed solution to a temperature of 70° C. to 95° C.

According to some specific embodiments of the present invention, the reaction by heating in step S2 is carried out for a duration of 0.5 hours (h) to 24 h.

According to some specific embodiments of the present invention, the reaction by heating in step S2 is carried out for a duration of 3 h to 10 h.

According to some specific embodiments of the present invention, the reaction by heating in step S2 is carried out for a duration of 4 h to 8 h.

According to some specific embodiments of the present invention, the drying in step S3 is carried out at a temperature of 20° C. to 80° C.

According to some specific embodiments of the present invention, the low-temperature annealing treatment in step S4 is carried out at a temperature of 120° C. to 200° C. for a duration of 0.5 h to 12 h.

According to some specific embodiments of the present invention, the low-temperature annealing treatment in step S4 is carried out for a duration of 1 h to 12 h.

According to some specific embodiments of the present invention, the low-temperature annealing treatment in step S4 is a low-temperature annealing treatment carried out in an air atmosphere, an inert gas atmosphere or a reducing gas atmosphere.

According to some specific embodiments of the present invention, the liquid thermal reaction in step S5 is carried out at a temperature of 80° C. to 150° C. for a duration of 1 h to 24 h.

According to some specific embodiments of the present invention, the liquid thermal reaction in step S5 is carried out by dispersing the precursor having a nanowire-like structure after the low-temperature annealing treatment in step S4 into water or a lithium hydroxide aqueous solution.

According to some specific embodiments of the present invention, the lithium hydroxide aqueous solution in step S5 has a concentration of 0.05 mol/L to 0.3 mol/L.

According to some specific embodiments of the present invention, the method further comprises the step of surface modification of the nanotube hierarchically structured lithium titanate obtained in step S5, wherein the step of surface modification comprises loading the nanotube hierarchically structured lithium titanate with one or more of carbon, carbon nanotubes, graphene, and black phosphorus.

In another aspect, the present invention further provides a nanotube hierarchically structured lithium titanate prepared by the preparation method of the present invention.

In yet another aspect, the present invention further provides an ion battery electrode prepared with the nanotube hierarchically structured lithium titanate.

According to some specific embodiments of the present invention, the ion battery is selected from a lithium ion battery, a sodium ion battery, a potassium ion battery, or a magnesium ion battery.

In yet another aspect, the present invention further provides a preparation method of a nanotube hierarchically structured titanic acid, wherein the method comprises subjecting the nanotube hierarchically structured lithium titanate of the present invention to acid exchange to obtain the nanotube hierarchically structured titanic acid.

According to some specific embodiments of the present invention, the method comprises subjecting the nanotube hierarchically structured lithium titanate of the present invention to an acid exchange, followed by washing, separation, and drying, to obtain the nanotube hierarchically structured titanic acid.

According to some specific embodiments of the present invention, the acid exchange comprises placing the nanotube hierarchically structured lithium titanate into an acid solution for hydrogen ion exchange to obtain the nanotube hierarchically structured titanic acid.

According to some specific embodiments of the present invention, the acid solution is selected from one or more of a nitric acid solution, a hydrochloric acid solution, a sulfuric acid solution, and an acetic acid solution, and the acid in the acid solution has a concentration of 0.001 mol/L to 0.1 mol/L.

According to some specific embodiments of the present invention, the acid in the acid solution has a concentration of 0.01 mol/L to 0.1 mol/L.

In yet another aspect, the present invention further provides a nanotube hierarchically structured titanic acid prepared by the preparation of the present invention.

In yet another aspect, the present invention further provides the use of the nanotube hierarchically structured titanic acid in the manufacture of an ion battery or for contaminant adsorption.

According to some specific embodiments of the present invention, the ion battery is selected from a lithium ion battery, a sodium ion battery, a potassium ion battery, or a magnesium ion battery.

In still another aspect, the present invention further provides a preparation method of a nanotube hierarchically structured titanium oxide, wherein the method comprises subjecting the nanotube hierarchically structured titanic acid of the present invention to a hydrothermal reaction and/or high temperature annealing to obtain the nanotube hierarchically structured titanium oxide.

According to some specific embodiments of the present invention, reaction system of the hydrothermal reaction is selected from a neutral aqueous system, an acidic aqueous system or an alkaline aqueous system.

The acidic aqueous system may be an aqueous solution of a conventional acid in the art, such as an aqueous solution of one selected from sulfuric acid, hydrochloric acid, nitric acid, and acetic acid.

The alkaline aqueous system may be an aqueous solution of a conventional alkaline in the art, such as an aqueous solution of sodium hydroxide or potassium hydroxide, or aqueous ammonia.

According to some specific embodiments of the present invention, the hydrothermal reaction is carried out at a temperature of 100° C. to 200° C. for a duration of 1 h to 24 h.

According to some specific embodiments of the present invention, the hydrothermal reaction is carried out at a temperature of 120° C. to 180° C.

According to some specific embodiments of the present invention, the hydrothermal reaction is carried out for a duration of 6 h to 24 h.

According to some specific embodiments of the present invention, the high-temperature annealing is carried out at a temperature of 350° C. to 800° C. for a duration of 1 h to 24 h.

According to some specific embodiments of the present invention, the high-temperature annealing is carried out at a temperature of 400° C. to 600° C.

According to some specific embodiments of the present invention, the high-temperature annealing is carried out for a duration of 2 h to 6 h; preferably 3 h to 4 h.

In yet another aspect, the present invention further provides a nanotube hierarchically structured titanium oxide prepared by the preparation method of the present invention.

In summary, the present invention provides a preparation method of a nanotube hierarchically structured lithium titanate and the use and product thereof. The technical solutions of the present invention have the following advantages:

(1) The hierarchical structure provided by the method of the present invention may increase the specific surface area of nanotubes and increase the active sites for reaction.

(2) The hierarchical structure provided by the method of the present invention is an ordered structural assembly, which can reduce the grain boundary between the particles in the hierarchical structure, facilitates the effective migration of carriers such as electrons between the particles, and improves the applied effect of the material.

(3) The one-dimensional nanotube-like structure facilitates the transport of carriers such as electrons in the long-axis direction, and improves the applied effect of the material.

(4) The method includes a simple process and easily controllable process parameters, and may be easily scale-up for industrialized production.

(5) The method uses readily available raw materials and has a low production cost.

The nanotube hierarchically structured lithium titanate has the following advantages in application:

(1) The long-axis of the hierarchical structure facilitates the effective migration of electrons, the hierarchical structure facilitates the rapid intercalation and deintercalation process of lithium ions, sodium ions, or potassium ions, and the large specific surface area contributes to the contact area between the electrolyte solution and the electrodes and reduce current density, thereby providing an excellent rapid charging-discharging performance of the battery.

(2) The hierarchical structure is beneficial to electron-hole separation, increases catalytic reactive sites, has high photocatalytic activity, and facilitates water photohydrolysis for hydrogen generation or photocatalytic degradation of organic pollutants.

(3) The hierarchical structure has a large specific surface area capable of adsorbing more dyes and a one-dimensional structure facilitating electron transmission, which is advantageous in solar cells.

(4) The hierarchical structure is favorable for gas sensing, for example, sensing of gases such as hydrogen, oxygen, formaldehyde, propane, ethane, methane, carbon monoxide, carbon dioxide, and water vapor.

(5) The hierarchical structure has a large specific surface area capable of adsorbing more organic substances or heavy metal ions, which is effective in environmental management; at the same time, a single hierarchically structured nanotube has a large mass and volume, can be easily separated by sedimentation or with a membrane, thereby increasing the reusability of the material.

DETAILED DESCRIPTION

Hereinafter, the implementation of the present disclosure and the beneficial effects thereof are described in details by way of specific examples, which is intended to provide a better understanding of the spirit and features of the present disclosure, but cannot be construed as limitation to the scope of implementation of the present disclosure.

Example 1

Figure 1:
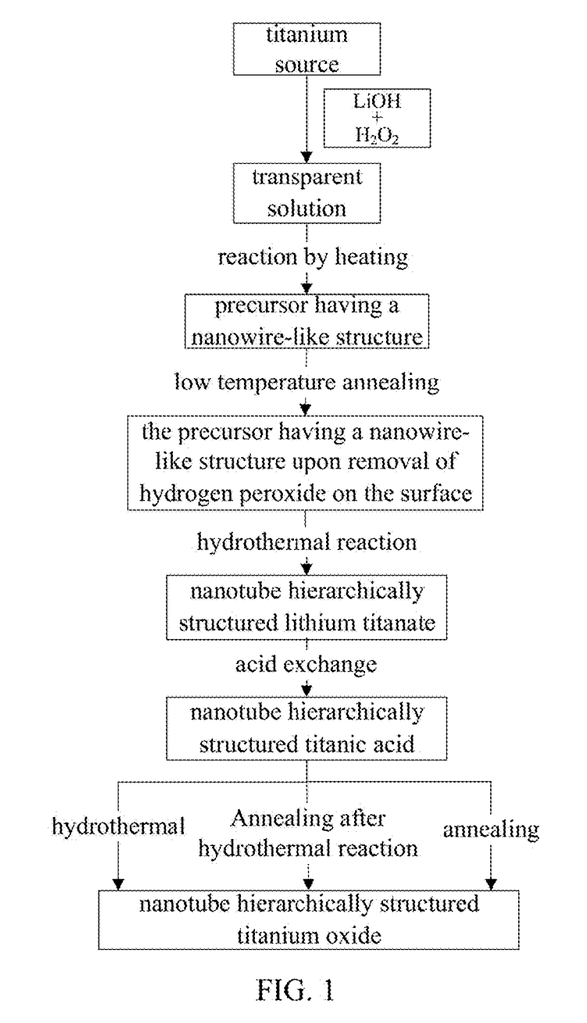
FIG. 1 shows the procedure of the preparation of the nanotube hierarchically structured titanium oxide.
Figure 2:
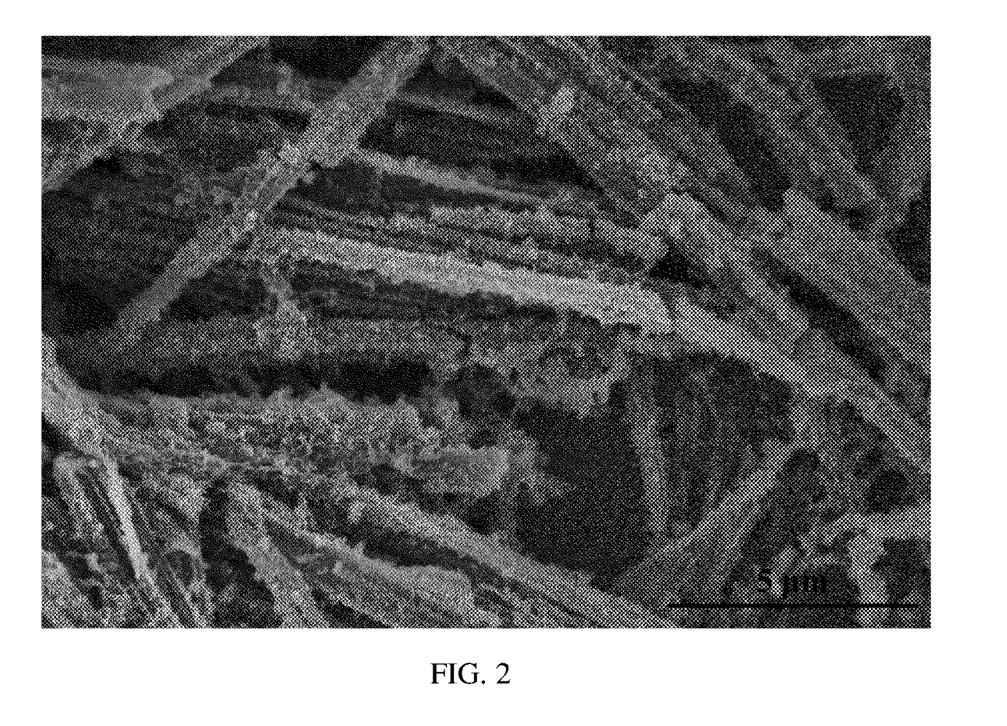
FIG. 2 is an SEM image of a nanotube hierarchically structured lithium titanate according to Example 1.
Figure 3:
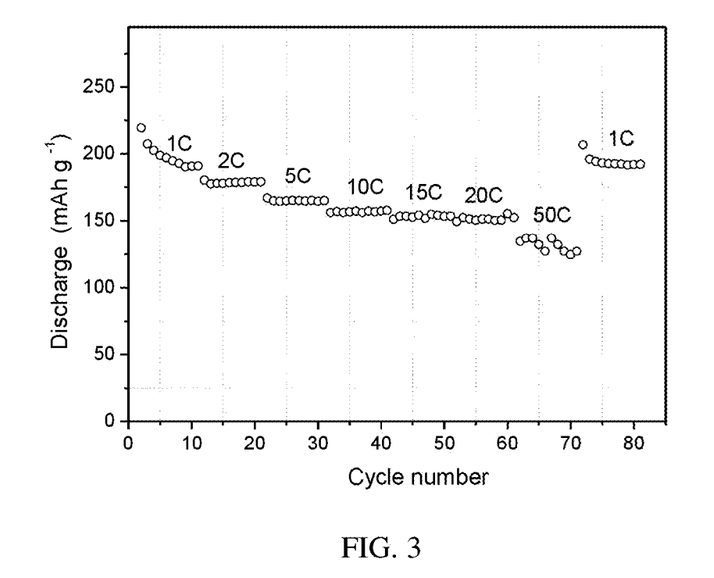
FIG. 3 is a diagram showing the discharging capacity of a lithium ion battery at different charging and discharging rates when the hierarchically structured lithium titanate obtained in the Example 1 is applied to the negative electrode of a lithium ion battery.

According to the procedure shown in FIG. 1, under stirring, 1 g of titanium oxysulfate was dispersed and dissolved into 100 ml of water to form a solution, and then aqueous ammonia at a concentration of 0.05 mol/L was slowly added dropwise to the solution until the solution became neutral, so that titanium oxysulfate was gradually and completely hydrolyzed to form a titanic acid hydrate precipitate. Subsequently, the titanic acid hydrate precipitate was ultrasonically dispersed, washed several times with deionized water, and separated by centrifugation. Thereafter, hydrogen peroxide and lithium hydroxide were dissolved in water to form an aqueous solution having a lithium hydroxide concentration of 0.7 mol/L and a hydrogen peroxide volume fraction of 2.5%. Subsequently, the separated titanic acid hydrate precipitate was dispersed in 100 ml of the above-prepared lithium hydroxide aqueous solution containing hydrogen hydroxide with stirring to form a yellow transparent solution. Next, the above yellow transparent solution was heated to 75° C. and then stirred at constant temperature for 8 hours, and the reaction was stopped and separated to give a white solid. Subsequently, the above white solid was placed in an oven and dried at 60° C. for 20 hours. Then, the dried white solid powder was placed in an oven for annealing at 120° C. for 12 hours so as to remove hydrogen peroxide on the surface of the nanowire. After that, the above low-temperature treated white solid powder was dispersed in 100 mL of pure water and reacted at 100° C. for 5 hours, to give a nanotube hierarchically structured lithium titanate product. The SEM image thereof is shown in FIG. 2. FIG. 3 is a diagram showing the discharging capacity of a lithium ion battery at different charging and discharging rates when the hierarchically structured lithium titanate obtained in the Example 1 is applied to the negative electrode of a lithium ion battery. The lithium ion battery electrode was prepared by using a knife coating process. Firstly, a slurry was prepared in a mass ratio of hierarchically structured sodium titanate microspheres: Super P: polyvinylidene fluoride (PVDF)=7:2:1 in N-methylpyrrolidone (NMP) as solvent. Subsequently, the slurry was uniformly coated on a copper foil with a knife coater, and a model CR2032 button cell was assembled in a glove box by using metallic lithium as a counter electrode, 1 mol/L $LiPF_6$/EC-DMC-EMC (1:1:1) as electrolyte, and Glass Fiber as a separator, and subjected to an electrochemical test. As can be seen from FIG. 3, the materials achieve excellent results in the lithium ion battery performance test, and the battery has a high discharging capacity even at different charging and discharging rates.

Example 2

Under stirring, 2 g of titanium sulfate was dispersed and dissolved into 100 ml of water to form a solution, and then sodium hydroxide at a concentration of 0.10 mol/L was slowly added dropwise to the solution until the solution became neutral, so that titanium sulfate was gradually and completely hydrolyzed to form a titanic acid hydrate precipitate. Subsequently, the titanic acid hydrate precipitate was ultrasonically dispersed, washed several times with deionized water, and separated by centrifugation. Thereafter, hydrogen peroxide and lithium hydroxide were dissolved in water to form an aqueous solution having a lithium hydroxide concentration of 0.8 mol/L and a hydrogen peroxide volume fraction of 5%. Subsequently, the separated titanic acid hydrate precipitate was dispersed in 100 ml of the above-prepared lithium hydroxide aqueous solution containing hydrogen hydroxide with stirring to form a yellow transparent solution. Next, the above yellow transparent solution was heated to 85° C. and then stirred at constant temperature for 6 hours, the reaction was stopped and separated to give a white solid. Then, the above white solid was placed in an oven and vacuum dried at 25° C. for 24 hours. After that, the dried white solid powder was placed in an oven for annealing at 120° C. for 12 hours so as to remove hydrogen peroxide on the surface of the nanowire. Subsequently, the above low-temperature treated white solid powder was dispersed in 100 mL of pure water containing 40% ethanol and reacted at 120° C. for 6 hours, to give a nanotube hierarchically structured lithium titanate product. The SEM image thereof is substantially the same as FIG. 2.

Example 3

Under stirring, 5 g of titanium tetrachloride was dispersed and dissolved into 100 ml of water to form a solution, and then potassium hydroxide at a concentration of 0.10 mol/L was slowly added dropwise to the solution until the solution became neutral, so that titanium tetrachloride was gradually and completely hydrolyzed to form a titanic acid hydrate precipitate. Subsequently, the titanic acid hydrate precipitate was ultrasonically dispersed, washed several times with deionized water, and separated by centrifugation. Thereafter, hydrogen peroxide and lithium hydroxide were dissolved in water to form an aqueous solution having a lithium hydroxide concentration of 0.6 mol/L and a hydrogen peroxide volume fraction of 4%. Subsequently, the separated titanic acid hydrate precipitate was dispersed in 200 ml of the above-prepared lithium hydroxide aqueous solution containing hydrogen hydroxide with stirring to form a yellow transparent solution. Next, the above yellow transparent solution was heated to 95° C. and then stirred under constant temperature for 4 hours, the reaction was stopped and separated to give a white solid. Then, the above white solid was placed in an oven and vacuum dried at 80° C. for 12 hours. After that, the dried white solid powder was placed in an oven for annealing at 150° C. for 6 hours so as to remove hydrogen peroxide on the surface and inside of the nanowire. Subsequently, the above low-temperature treated white solid powder was dispersed in 200 mL of an aqueous solution containing 0.01 mol/L nitric acid and reacted at 140° C. for 2 hours, to give a nanotube hierarchically structured lithium titanate product. The SEM image thereof is substantially the same as FIG. 2.

Example 4

Under stirring, 3 g of titanium isopropoxide was dispersed 100 ml of an aqueous solution for direct hydrolysis to form a titanic acid hydrate precipitate. Subsequently, the titanic acid hydrate precipitate was ultrasonically dispersed, washed several times with deionized water, and separated by centrifugation. Thereafter, hydrogen peroxide and lithium hydroxide were dissolved in water to form an aqueous solution having a lithium hydroxide concentration of 0.8 mol/L and a hydrogen peroxide volume fraction of 5%. Subsequently, the separated titanic acid hydrate precipitate was dispersed in 100 ml of the above-prepared lithium hydroxide aqueous solution containing hydrogen hydroxide under stirring to form a yellow transparent solution. Next, the above yellow transparent solution was heated to 80° C. and then stirred under constant temperature for 4 hours, the reaction was stopped and separated to give a white solid. Subsequently, the above white solid was placed in an oven and vacuum dried at 70° C. for 15 hours. Then, the dried white solid powder was placed in an oven for annealing at 200° C. for 1 hour so as to remove hydrogen peroxide on the surface and inside of the nanowire. After that, the above low-temperature treated white solid powder was dispersed in 150 mL of an aqueous solution containing 0.1 mol/L lithium hydroxide and reacted at 150° C. for 1.5 hours, to give a nanotube hierarchically structured lithium titanate product. The SEM image thereof is substantially the same as FIG. 2.

Example 5

Hydrogen peroxide and lithium hydroxide were first dissolved in water to form 100 ml of an aqueous solution having a lithium hydroxide concentration of 0.9 mol/L and a hydrogen peroxide volume fraction of 3%. Under stirring, 1 g of titanium oxysulfate was slowly added to the above aqueous solution with stirring to form a yellow transparent solution. Next, the above yellow transparent solution was heated to 70° C. and then stirred under constant temperature for 8 hours, the reaction was stopped and separated to give a white solid. Subsequently, the above white solid was placed in an oven and vacuum dried at 60° C. for 20 hours. Subsequently, the dried white solid powder was placed in a tube furnace for annealing at 150° C. for 3 hours under a nitrogen atmosphere to remove hydrogen peroxide on the surface and inside of the nanowire. After that, the above low-temperature treated white solid powder was dispersed in 100 mL of pure water and reacted at 100° C. for 5 hours, to give a nanotube hierarchically structured lithium titanate product. The SEM image thereof is substantially the same as FIG. 2.

Example 6

Hydrogen peroxide and lithium hydroxide were first dissolved in water to form 100 ml of an aqueous solution having a lithium hydroxide concentration of 0.6 mol/L and a hydrogen peroxide volume fraction of 2%. Under stirring, 1 g of tetrabutyl titanate was slowly added to the above aqueous solution with stirring to form a yellow transparent solution. Next, the above yellow transparent solution was heated to 80° C. and then stirred under constant temperature for 5 hours, the reaction was stopped and separated to give a white solid. Subsequently, the above white solid was placed in an oven and vacuum dried at 60° C. for 20 hours. Then, the dried white solid powder was placed in a tube furnace for annealing at 150° C. for 3 hours under a nitrogen atmosphere to remove hydrogen peroxide on the surface and inside of the nanowire. After that, the above low-temperature treated white solid powder was dispersed in 100 mL of pure water containing 40% ethanol and reacted at 120° C. for 3 hours, to give a nanotube hierarchically structured lithium titanate product. The SEM image thereof is substantially the same as FIG. 2.

Example 7

The nanotube hierarchically structured lithium titanate prepared in Example 1 was separated, placed in an oven, and dried at 120° C. for 24 hours. Subsequently, the dried nanotube hierarchically structured lithium titanate was separated by washing several times with deionized water and then placed in a 0.01 mol/L nitric acid solution for hydrogen ion exchange. After the hydrogen ion exchange, it is washed several times with deionized water until the pH of the washing liquid was near neutral, and then separated and dried, to give a nanotube hierarchically structured titanic acid.

Example 8

The nanotube hierarchically structured lithium titanate prepared in Example 1 was separated, placed in an oven, and dried at 150° C. for 12 hours. Subsequently, the dried nanotube hierarchically structured lithium titanate was separated by washing several times with deionized water and then placed in a 0.05 mol/L hydrochloric acid solution for hydrogen ion exchange. After the hydrogen ion exchange, it is washed several times with deionized water until the pH of the washing liquid was near neutral, and then separated and dried, to give a nanotube hierarchically structured titanic acid.

Example 9

The nanotube hierarchically structured lithium titanate prepared in Example 1 was separated, placed in an oven, and dried at 200° C. for 4 hours. Subsequently, the dried nanotube hierarchically structured lithium titanate was separated by washing several times with deionized water and then placed in a 0.1 mol/L acetic acid solution for hydrogen ion exchange. After the hydrogen ion exchange, it is washed several times with deionized water until the pH of the washing liquid was near neutral, and then separated and dried, to give a nanotube hierarchically structured titanic acid.

Example 10

Figure 4:
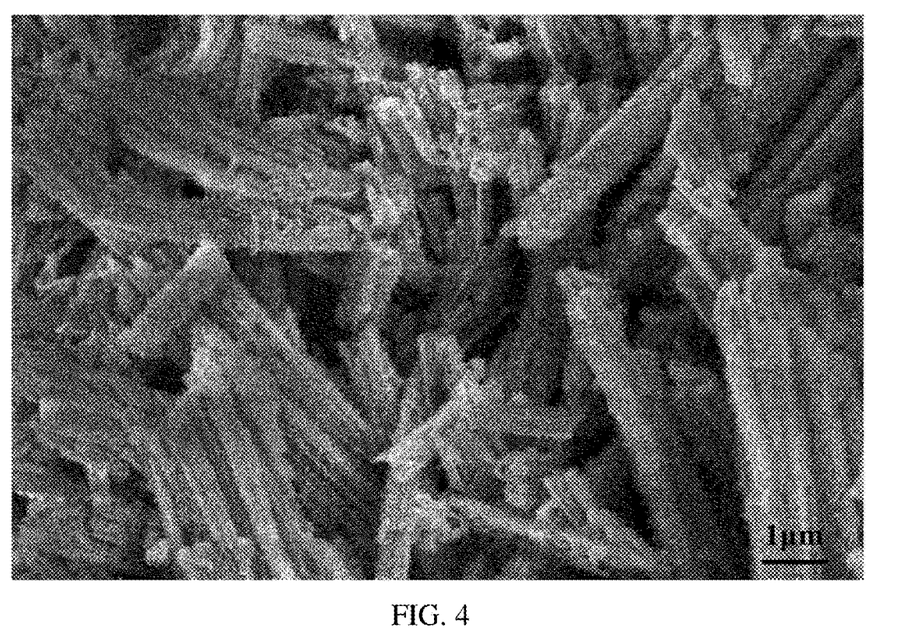
FIG. 4 is an SEM image of the nanotube hierarchically structured titanium oxide.
Figure 5:
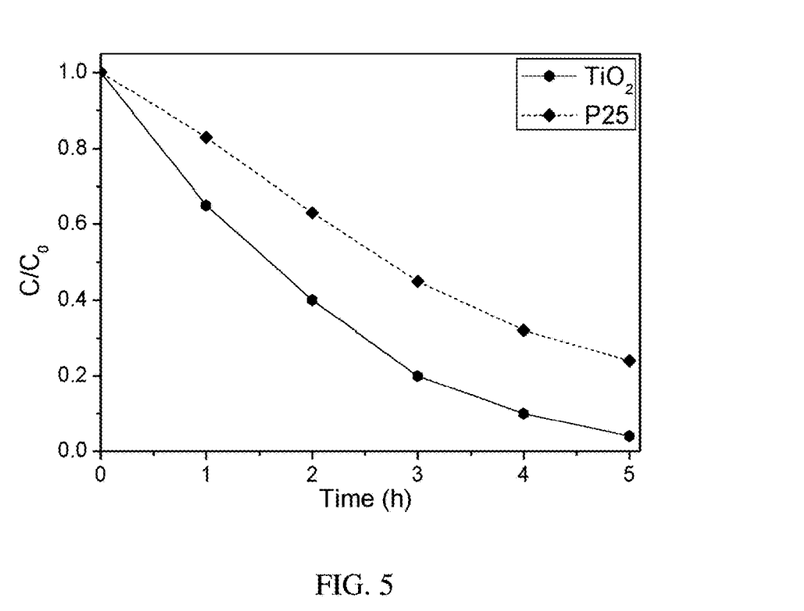
FIG. 5 is a diagram showing the rate of photocatalytic degradation of methylene blue with the nanotube hierarchically structured titanium oxide according to Example 10.

The nanotube hierarchically structured lithium titanate prepared in Example 7 was placed in a muffle furnace and annealed at 400° C. for 4 hours, to obtain a nanotube hierarchically structured titanium oxide. The SEM image thereof is shown in FIG. 4. FIG. 5 is a diagram showing the rate of photocatalytic degradation of methylene blue with the nanotube hierarchically structured titanium oxide in this example. The test was carried out under the conditions in which 50 mg of the hierarchically structured titanium dioxide product prepared in this example was dispersed in a 10 mg/L methylene blue solution, with the diagram showing the rate of photocatalytic degradation of methylene blue by irradiation with a 3 watt LED UV lamp. Under the same test conditions, P25 was used as a reference substance. It can be seen from FIG. 5 that the performance of the material prepared in this example in photocatalytic decomposition of an organic substance is better than that of the existing commercialized product P25, and is promising for application in photocatalytic decomposition of organic pollutants.

Example 11

The nanotube hierarchically structured titanic acid prepared in Example 7 was placed in a muffle furnace and annealed at 600° C. for 3 hours to obtain a nanotube hierarchically structured titanium oxide. The SEM image thereof is substantially the same as FIG. 4.

Example 12

The nanotube hierarchically structured titanic acid prepared in Example 7 was dispersed in 100 mL of pure water and reacted at 180° C. for 6 hours to obtain a nanotube hierarchically structured titanium oxide. The SEM image thereof is substantially the same as FIG. 4.

Example 13

The nanotube hierarchically structured titanic acid prepared in Example 7 was dispersed in 100 mL of a nitric acid solution having a concentration of 0.01 mol/L and reacted at 150° C. for 12 hours to obtain a nanotube hierarchically structured titanium oxide. The SEM image thereof is substantially the same as FIG. 4.

Example 14

The nanotube hierarchically structured titanic acid prepared in Example 7 was dispersed in 100 mL of an aqueous ammonia solution having a concentration of 0.01 mol/L and reacted at 120° C. for 24 hours to obtain a nanotube hierarchically structured titanium oxide. The SEM image thereof is substantially the same as FIG. 4.

What is claimed is:

1. A preparation method of a nanotube hierarchically structured lithium titanate, wherein the method comprises the steps of:
    S1. dispersing a titanium source into an aqueous solution containing lithium hydroxide and hydrogen peroxide and stirring to obtain a mixed solution;
    S2. subjecting the mixed solution obtained in step S1 to a reaction by heating to obtain a precursor having a nanowire structure;
    S3. subjecting the precursor having a nanowire structure obtained in step S2 to separation and drying;
    S4. subjecting the precursor having a nanowire structure after separation and drying to a low-temperature annealing treatment; and
    S5. subjecting the precursor having a nanowire structure after the low-temperature annealing treatment to a liquid thermal reaction to obtain the nanotube hierarchically structured lithium titanate.

2. The preparation method according to claim 1, wherein the titanium source is selected from one or more of titanium ethoxide, titanium isopropoxide, titanium propoxide, tetrabutyl titanate, titanium glycolate, titanium glyceroxide, titanium sulfate, titanium oxysulfate, titanium tetrachloride, titanium tetrafluoride, ammonium fluorotitanate, titanium nitride, titanium oxide, metatitanic acid, and orthotitanic acid.

3. The preparation method according to claim 1, wherein the titanium source is selected from titanic acid hydrate.

4. The preparation method according to claim 3, wherein the titanic acid hydrate is obtained from a hydrolysis reaction of a titanium-containing compound.

5. The preparation method according to claim 4, wherein the titanium-containing compound is selected from one or more of titanium ethoxide, titanium isopropoxide, titanium propoxide, tetrabutyl titanate, titanium glycolate, titanium glyceroxide, titanium sulfate, titanium oxysulfate, titanium tetrachloride, titanium tetrafluoride, and ammonium fluorotitanate.

6. The preparation method according to claim 3, wherein in the hydrolysis reaction, the titanium-containing compound is dispersed in pure water to be directly hydrolyzed to form the titanic acid hydrate; or
    in the hydrolysis reaction, the titanium-containing compound is dispersed in an aqueous solution containing an alkali substance to be hydrolyzed to form the titanic acid hydrate.

7. The preparation method according to claim 6, wherein the titanic acid hydrate is obtained by subjecting the titanium-containing compound to a hydrolysis reaction and a purification treatment; and the purification treatment comprises purifying the product obtained after the hydrolysis reaction of the titanium-containing compound to obtain a titanic acid hydrate having a purity of 97% or more.

8. The preparation method according to claim 1, wherein, in step S1, the concentration of lithium hydroxide in the aqueous solution containing lithium hydroxide and hydrogen peroxide is 0.4 mol/L to 1.0 mol/L, and the volume fraction of hydrogen peroxide in the aqueous solution containing lithium hydroxide and hydrogen peroxide is 0.5% to 10%.

9. The preparation method according to claim 1, wherein the reaction by heating in step S2 is carried out by heating the mixed solution to a temperature of 60° C. to 100° C.

10. The preparation method according to claim 9, wherein, the duration of the reaction is 0.5 h to 24 h.

11. The preparation method according to claim 1, wherein the drying in step S3 is carried out at a temperature of 20° C. to 80° C.

12. The preparation method according to claim 1, wherein the low-temperature annealing treatment in step S4 is carried out at a temperature of 120° C. to 200° C. for a duration of 0.5 h to 12 h.

13. The preparation method according to claim 1, wherein the low-temperature annealing treatment in step S4 is a low-temperature annealing treatment carried out in an air atmosphere, an inert gas atmosphere or a reducing gas atmosphere.

14. The preparation method according to claim 1, wherein the liquid thermal reaction in step S5 is carried out at a temperature of 80° C. to 150° C. for a duration of 1 h to 24 h.

15. The preparation method according to claim 1, wherein the method further comprises the step of surface modification of the nanotube hierarchically structured lithium titanate obtained in step S5, wherein the step of surface modification comprises loading the nanotube hierarchically structured lithium titanate with one or more of carbon, carbon nanotubes, graphene, and black phosphorus.

* * * * *